United States Patent [19]

Jennings

[11] Patent Number: 5,044,272
[45] Date of Patent: * Sep. 3, 1991

[54] ROUND BALER WITH ROLLERS AND BELTS

[75] Inventor: Richard E. Jennings, Manheim, Pa.

[73] Assignee: Ford New Holland, Inc., New Holland, Pa.

[*] Notice: The portion of the term of this patent subsequent to Dec. 25, 2007 has been disclaimed.

[21] Appl. No.: 599,182

[22] Filed: Oct. 17, 1990

Related U.S. Application Data

[60] Division of Ser. No. 244,221, Sep. 14, 1988, Pat. No. 4,979,442, which is a continuation of Ser. No. 63,390, Jun. 18, 1987, Pat. No. 4,771,595.

[51] Int. Cl.⁵ .......................... B30B 3/04; B30B 5/04; A01D 39/00
[52] U.S. Cl. ......................................... 100/89; 56/341
[58] Field of Search ................... 100/5, 76, 87, 88, 89; 56/341–343

[56] References Cited

U.S. PATENT DOCUMENTS

| | | | |
|---|---|---|---|
| 1,881,774 | 10/1932 | Mackenzie | 100/89 X |
| 4,135,352 | 1/1979 | Swenson et al. | 56/341 |
| 4,334,467 | 6/1982 | Nishibe et al. | 100/89 |
| 4,514,969 | 5/1985 | Moosbrucker et al. | 100/88 X |
| 4,550,557 | 11/1985 | Vissers et al. | 100/89 X |
| 4,566,379 | 1/1986 | Decoene et al. | 100/89 |
| 4,759,279 | 7/1988 | Frerich | 100/89 |
| 4,763,464 | 8/1988 | Mouret | 100/88 X |

FOREIGN PATENT DOCUMENTS

| | | | |
|---|---|---|---|
| 8501416 | 12/1986 | Netherlands | 100/88 |
| 2152873 | 8/1985 | United Kingdom | 100/88 |
| 2169551 | 7/1986 | United Kingdom | 100/88 |

Primary Examiner—Harvey C. Hornsby
Assistant Examiner—Stephen F. Gerrity
Attorney, Agent, or Firm—Darrell F. Marquette; Frank A. Seemar; Larry W. Miller

[57] ABSTRACT

A machine for making cylindrical bales of crop material utilizes a combination of rollers and belts arranged to define a bale starting chamber. A run of the belts forms the rear wall of the bale starting chamber while the rollers form the front wall of the bale starting chamber. The belt run extends upwardly and forwardly when the chamber is empty and is expandable in length during bale formation.

6 Claims, 1 Drawing Sheet

ROUND BALER WITH ROLLERS AND BELTS

This application is a division of application Ser. No. 07/244,221 filed Sept. 14, 1988, now U.S. Pat. No. 4,979,442, which is a continuation of application Ser. No. 07/063,390 filed June 18, 1987, now U.S. Pat. No. 4,771,595.

BACKGROUND OF THE INVENTION

This invention relates generally to agricultural balers and, in particular, to machines typically referred to as "round balers" which form cylindrical bales of crop material.

Two basic types of round balers exist today. The fixed chamber type of round baler forms bales with a soft core and a hard outer shell whereas the expanding chamber type of round baler forms bales with a hard core and a relatively uniform density throughout. An advantage of soft core bales is that they suffer only minimal rotting of the core even if moist crop material is baled. However, a disadvantage of soft core bales is that they tend to sag into an odd shape when stored for extended periods of time. An advantage of hard core bales is that they minimize the sagging problem of soft core bales but a disadvantage of hard core bales is that they have core rotting problems.

Three basic types of bale forming elements have been used in round balers. These are chain and slat aprons, belts and rollers. Each type of bale forming element has advantages and disadvantages. For example, an advantage of chain and slat aprons is that they are capable of starting bales in almost all crop conditions but a disadvantage of these aprons is that they often form bales with rough outer surfaces. An advantage of belts is that they form bales with smooth outer surfaces but belts have a disadvantage in that they have bale starting problems in certain crop conditions. Rollers also have the advantage of forming bales with smooth outer surfaces but they have a disadvantage of resulting in losses of crop material through the gaps between adjacent rollers.

It is an object of the present invention to provide a machine which incorporates as many advantages as possible of the two basic types of round balers and the three basic types of bale forming elements while minimizing the disadvantages thereof.

SUMMARY OF THE INVENTION

The present invention provides a machine for making cylindrical bales of crop material. The machine comprises a bale starting chamber having a center, a front wall defined at least partially by a plurality of chamber rollers, and a rear wall defined entirely by a run of an endless flexible element supported by rotatable support elements. A take up and tensioning device for the endless flexible element includes a pair of arms which are pivotally mounted and which carry take up means engaged with the endless flexible element. The plurality of chamber rollers is arranged in an array disposed substantially arcuately about the center of the bale starting chamber for contacting a bale being started in the bale starting chamber with a lowermost chamber roller located substantially vertically below an uppermost chamber roller. The endless flexible element includes a plurality of belts arranged side-by-side. The rotatable support elements include an upper support roll and a lower support roll, and the run of the endless flexible element defining the rear wall of the bale starting chamber is formed by portions of the belts extending between the upper and lower support rolls. The upper support roll is located forwardly of a vertical transverse plane extending tangent to the lower support roll so that the run of the endless flexible element that defines the rear wall of the bale starting chamber is inclined upwardly and forwardly from the lower support roll. The lower support roll is spaced rearwardly of the lowermost chamber roller to define a crop receiving throat therebetween.

DESCRIPTION OF THE PREFERRED EMBODIMENT

Figure 1:
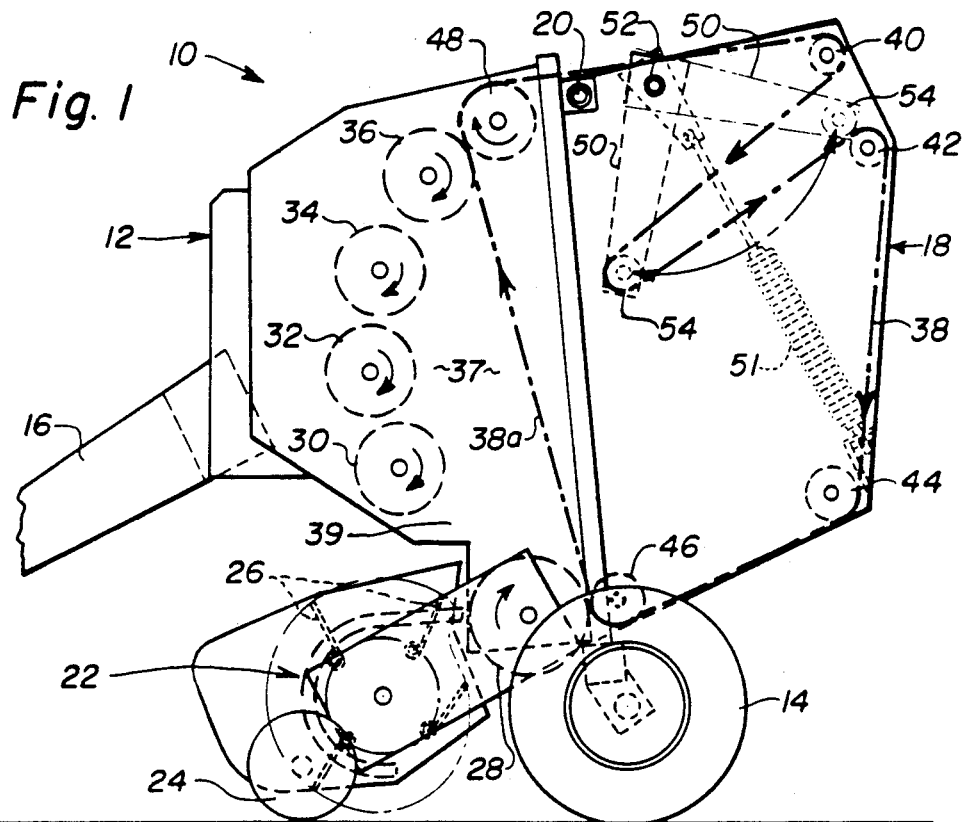
FIG. 1 is a side elevational view of a machine according to the preferred embodiment of the present invention.
Figure 2:
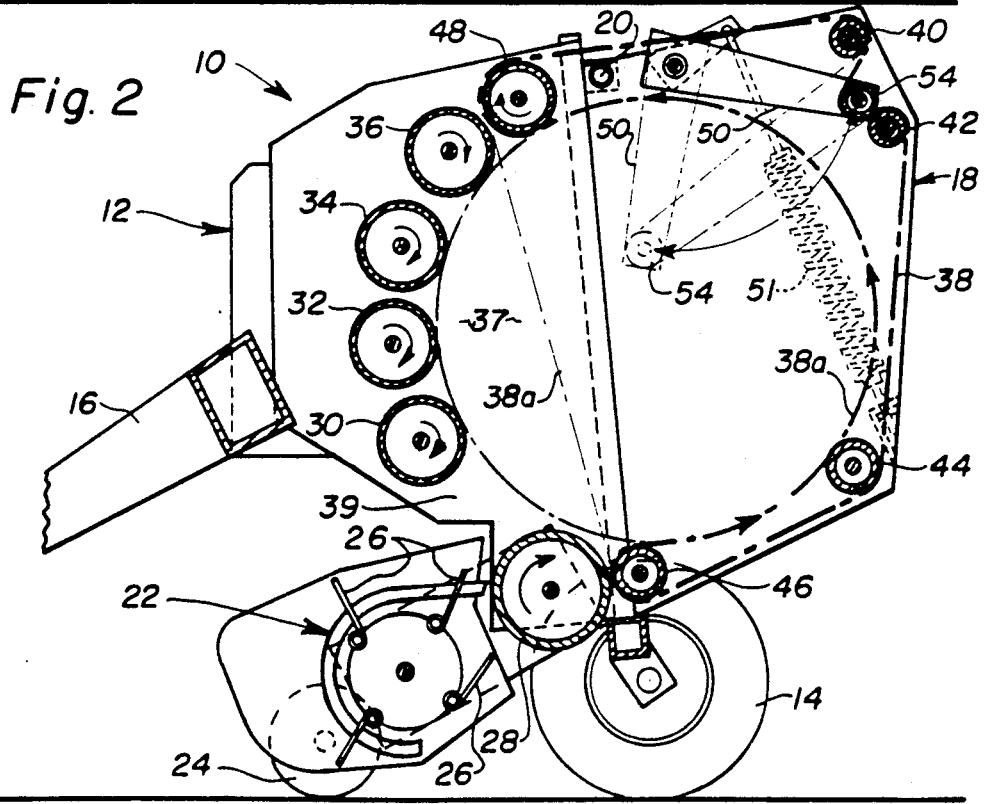
FIG. 2 is another side elevational view, partly in section, of the machine of FIG. 1.

Referring to FIGS. 1 and 2, a machine 10 according to the preferred embodiment of the present invention includes a main frame 12 supported by a pair of wheels 14. A tongue 16 is provided on the forward portion of the main frame 12 for connection to a tractor (not shown). An auxiliary frame or tailgate 18 is pivotally connected to the main frame 12 by stub shafts 20 for movement between a closed position shown in FIG. 1 and an open position (not shown). A conventional pickup 22 is mounted on the main frame 12 and is supported by a pair of wheels 24. The pickup 22 includes a plurality of fingers or tines 26 movable in a predetermined path to lift crop material from the ground and deliver it rearwardly toward a floor roll 28 which is rotatably mounted between the sidewalls of the main frame 12.

In accordance with the present invention, first bale forming means comprises a series of chamber rollers 30,32,34,36 extending between the sidewalls of the main frame 12 in an arcuate arrangement. Drive means (not shown) are provided to cause rotation of the chamber rollers 30,32,34,36 in a clockwise direction as indicated in FIGS. 1 and 2. Second bale forming means comprises an endless flexible element consisting of a plurality of belts 38 supported in a side-by-side arrangement between the sidewalls of the main frame 12 and between the sidewalls of the tailgate 18. The belts 38 are supported on rotatable support elements including guide rolls 40,42,44,46 rotatably mounted in the tailgate 18 and a drive roll 48 rotatably mounted in the main frame 12. Further drive means (not shown) are provided to cause rotation of the drive roll 48 which causes movement of the belts 38 along the path and in the direction indicated in FIG. 1 when the machine 10 is empty. A take up and tensioning device for the belts 38 includes a pair of arms 50 pivotally mounted on the tailgate 18 by a cross shaft 52 for movement between inner and outer positions shown in phantom and solid lines, respectively, in FIG. 2. Arms 50 carry a take up roll 54 for the belts 38. Resilient means such as springs 51 are provided to normally urge the arms 50 toward their inner position while resisting movement of the arms 50 from their inner position to their outer position.

When the machine 10 is in the empty condition shown in FIG. 1, the run 38a of the belts 38 extending between the lower support roll 46 and upper support 48 cooperates with the chamber rollers 30,32,34,36 to define a bale starting chamber 37. The upper support roll 48 is located forwardly of a vertical transverse plane extending tangent to the lower support roll 46 so that the run 38a of the belts 38 is inclined upwardly and forwardly from the lower support roll 46. The run 38a of the belts 38 forms the rear wall of the chamber 37 while the chamber rollers 30,32,34,36 form the front wall of the chamber 37. The uppermost roller 36 is positioned adjacent the upper support roll 48 to strip crop material from the belts 38, and the lowermost chamber roller 30 is spaced from the lower support roll 46 to form a crop receiving throat or inlet 39 for the chamber 37. The floor roll 28 is disposed forwardly of the lower support roll 46 but rearwardly of the lowermost chamber roll 30. The arms 50 will be urged into their inner position shown in phantom in FIG. 2 in order to start a bale.

As the machine 10 is towed across a field by a tractor (not shown), the pickup tines 26 lift crop material from the ground and feed it into the chamber 37 via the throat 39. The crop material is carried rearwardly by the floor roll 28 into engagement with the run 38a of the belts 38 which carry it upwardly into engagement with the chamber rollers 30,32,34,36. The crop material is coiled in a counterclockwise direction as viewed in FIG. 2 to start a bale. Continued feeding of crop material into the chamber 37 by the pickup tines 26 causes the run 38a of the belts 38 to expand in length around part of the bale as the diameter of the bale grows. The arms 50 rotate from their inner position shown in phantom in FIG. 2 toward their outer position shown in solid lines in FIG. 2 in order to permit expansion of the belt run 38a. When a full sized bale has been formed and then wrapped with a suitable material such as twine, the tailgate 18 is raised by conventional means such as hydraulic cylinders (not shown) to its open position for discharging the bale from the machine 10. Subsequent lowering of the tailgate 18 to its closed position returns the run 38a of the belts 38 to the location shown in FIG. 1 since the arms 50 are returned to their inner position shown in phantom in FIG. 2. The machine 10 is now ready to form another bale.

It should be understood that the peripheral speed of the chamber rollers 30,32,34,36 is substantially the same as the speed of the belts 38. This results in less crop loss, lower power requirements and smoother bale surface.

It will be understood that the combination of chamber rollers 30,32,34,36 and belts 38 used in the machine 10 of the present invention results in the formation of cylindrical bales with hard cores, hard outer shells, and smooth outer surfaces. This combination of rollers and belts also prevents bale starting problems in almost all crop conditions. Also, crop loss is minimized in the machine 10 of the present invention due to the location of the chamber rollers 30,32,34,36 above the throat 39.

Having thus described the invention, what is claimed is:

1. A machine for making cylindrical bales of crop material, comprising:

a bale starting chamber having a center, a front wall defined by a plurality of chamber rollers, and a rear wall defined by a run of an endless flexible element supported by rotatable support elements;

a take-up and tensioning device for said endless flexible element including a pair of arms which are pivotally mounted and which carry take-up means engaged with said endless flexible element;

said plurality of chamber rollers being arranged in an array disposed substantially arcuately about the center of said bale starting chamber for contacting a bale being started in said bale starting chamber with a lowermost chamber roller being located substantially vertically below an uppermost chamber roller; and said endless flexible element including a plurality of belts arranged side-by-side, said rotatable support elements including an upper support roll and a lower support roll, said run being formed by portions of the belts extending between said upper and lower support rolls with said upper support roll being located forwardly of a vertical transverse plane extending tangent to said lower support roll whereby said run is inclined upwardly and forwardly from said lower support roll, and said lower support roll being spaced rearwardly of said lowermost chamber roller thereby defining a crop-receiving throat therebetween.

2. The machine of claim 1, wherein, during formation of a cylindrical bale in said chamber, said chamber front wall is nonexpandable and said chamber rear wall is expandable.

3. The machine of claim 2, wherein each roller of said plurality of chamber rollers is mounted in a fixed position.

4. The machine of claim 1, wherein said take-up means comprises a single take-up roll.

5. The machine of claim 1, further comprising a floor roll disposed adjacent said lower support roll.

6. The machine of claim 5, wherein said floor roll is disposed forwardly of said lower support roll but rearwardly of said lowermost chamber roller.

* * * * *